US011981427B2

(12) United States Patent
Uehara et al.

(10) Patent No.: US 11,981,427 B2
(45) Date of Patent: May 14, 2024

(54) BRAKING FORCE GENERATION DEVICE, WING, AND AIRCRAFT

(71) Applicant: MITSUBISHI HEAVY INDUSTRIES, LTD., Tokyo (JP)

(72) Inventors: Motohide Uehara, Tokyo (JP); Kazuhiro Imai, Tokyo (JP); Yuki Morisaki, Tokyo (JP); Yasuhiro Saiki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 136 days.

(21) Appl. No.: 17/635,556

(22) PCT Filed: Feb. 10, 2020

(86) PCT No.: PCT/JP2020/005093
§ 371 (c)(1),
(2) Date: Feb. 15, 2022

(87) PCT Pub. No.: WO2021/053846
PCT Pub. Date: Mar. 25, 2021

(65) Prior Publication Data
US 2022/0297823 A1 Sep. 22, 2022

(30) Foreign Application Priority Data

Sep. 17, 2019 (JP) ................. 2019-168294

(51) Int. Cl.
*B64C 3/50* (2006.01)
*B64C 3/58* (2006.01)
(Continued)

(52) U.S. Cl.
CPC .................. *B64C 3/50* (2013.01); *B64C 3/58* (2013.01); *B64C 9/02* (2013.01); *B64C 9/323* (2013.01);
(Continued)

(58) Field of Classification Search
CPC .. B64C 21/08; B64C 3/50; B64C 3/58; B64C 21/025; B64C 9/323; B64C 21/02; B64C 9/02; B64C 9/12
See application file for complete search history.

(56) References Cited

U.S. PATENT DOCUMENTS 3,178,131 A 4/1965 Laing
3,721,406 A * 3/1973 Hurlbert ................. B64C 9/323
244/110 B
(Continued)

FOREIGN PATENT DOCUMENTS

DE 590004 12/1933
JP 2018-90240 6/2018

OTHER PUBLICATIONS

International Search Report dated Mar. 10, 2020 in corresponding International Application No. PCT/JP2020/005093.
(Continued)

*Primary Examiner* — Richard Green
*Assistant Examiner* — Nevena Aleksic
(74) *Attorney, Agent, or Firm* — Wenderoth, Lind & Ponack, L.L.P.

(57) ABSTRACT

A braking force generation device is configured to have: a first mode in which a deflector and a blocker door are retracted with respect to a wing; a second mode in which, in a state where: (i) a leading edge of the deflector is separated from the wing; (ii) a trailing edge of the deflector is at or adjacent to the wing; and (iii) the blocker door is deployed: a first flow path is formed on a lower surface side of the deflector for fluid to flow from a rear of the wing to a front of the wing via a cross flow fan from an opening on a blocker door side to a leading edge opening on a leading edge side
(Continued)

of the deflector in the first flow path; and a third mode in which a second flow path is formed on the lower surface side of the deflector.

10 Claims, 19 Drawing Sheets

(51) Int. Cl.
  *B64C 9/02* (2006.01)
  *B64C 9/32* (2006.01)
  *B64C 21/02* (2006.01)
  *B64C 21/08* (2023.01)
  *B64C 25/42* (2006.01)

(52) U.S. Cl.
  CPC ............ *B64C 21/025* (2013.01); *B64C 21/08* (2013.01); *B64C 25/42* (2013.01)

(56) References Cited

U.S. PATENT DOCUMENTS

| | | | |
|---|---|---|---|
| 4,828,203 A * | 5/1989 | Clifton | B64C 29/0033 244/12.3 |
| 2006/0266882 A1 | 11/2006 | Kummer et al. | |
| 2012/0111994 A1 | 5/2012 | Kummer et al. | |
| 2013/0009015 A1 * | 1/2013 | Golling | B64C 9/18 244/203 |
| 2016/0152334 A1 | 6/2016 | Prisell | |
| 2016/0311522 A1 * | 10/2016 | Wiegand | B64C 3/385 |
| 2018/0099736 A1 | 4/2018 | Kordel et al. | |
| 2018/0099737 A1 | 4/2018 | Wright | |
| 2020/0115040 A1 * | 4/2020 | Giannini | B64C 9/18 |

OTHER PUBLICATIONS

Office Action dated Jul. 8, 2022 in corresponding German Patent Application No. 112020004435.1, with English translation.

* cited by examiner

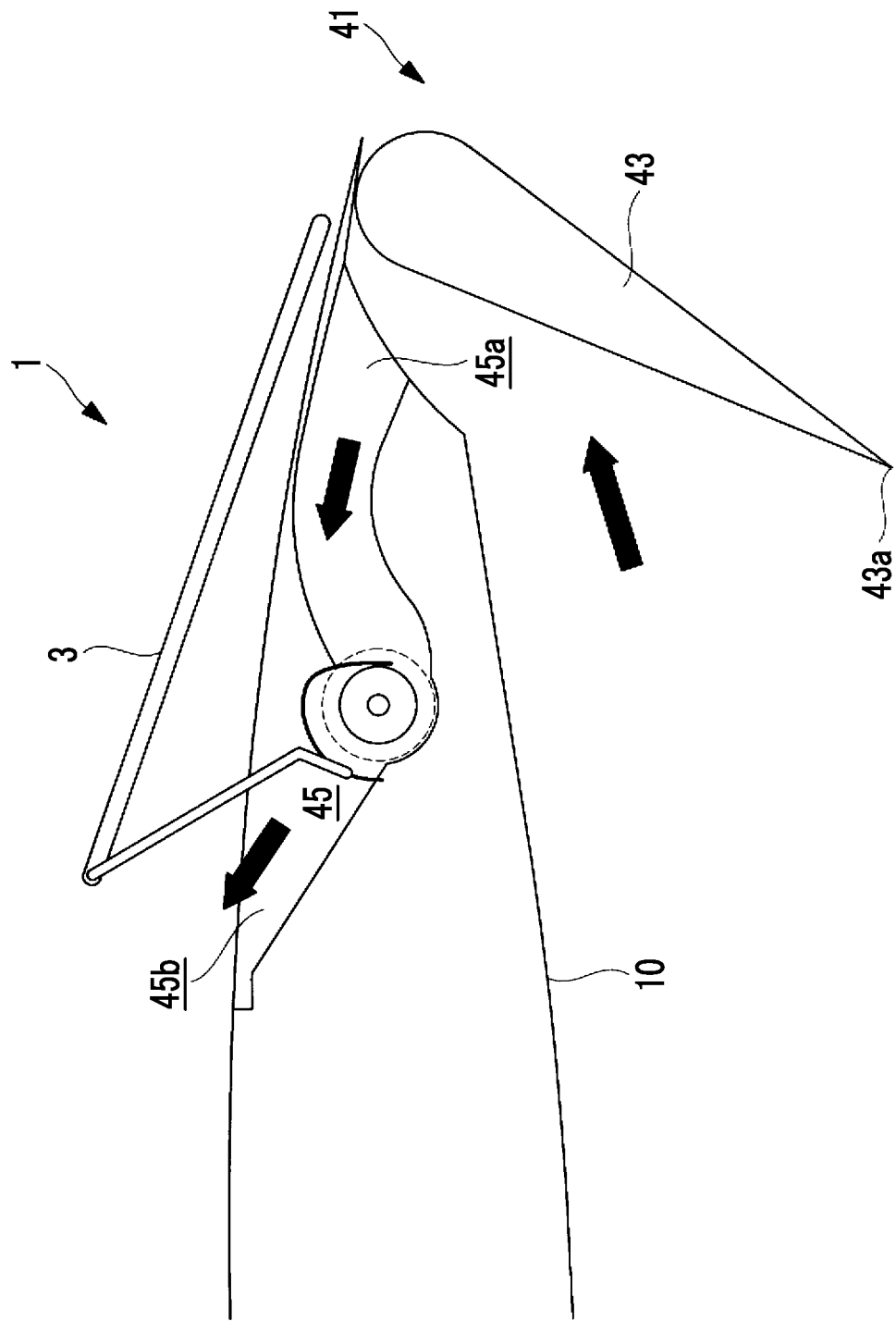

BRAKING FORCE GENERATION DEVICE, WING, AND AIRCRAFT

TECHNICAL FIELD

The present disclosure relates to a braking force generation device, a wing, and an aircraft.

BACKGROUND ART

At a main wing of an aircraft, in order to allow lift to be secured even during low-speed flight at the time of takeoff and landing where lift is insufficient, high lift devices are installed at a leading edge and a trailing edge of the main wing. For example, when an aircraft enters a landing phase, a high lift device is deployed in the sky to increase lift, so that stable flight at low speed is realized.

Further, in an aircraft, in order to shorten a running distance at the time of ground run after landing, while the aircraft is performing the ground run until it stops, in addition to wheel brakes and air brakes, thrust vectoring of changing the direction of an engine thrust to the front via a reverse injection mechanism of an engine is performed.

United States Patent Application Publication Nos. 2012/0111994 and 2006/0266882 disclose a technique in which a cross flow fan is installed at a wing and flow control is performed by the cross flow fan.

SUMMARY OF INVENTION

Technical Problem

In an aircraft, a reduction in landing speed is realized by a high lift device of the related art. However, in recent years, there has been a demand for improving performance in a low-speed flight state, that is, for generating higher lift. However, there is a limit to lift that an aircraft can obtain merely by driving and deploying the high lift device of the related art.

Further, there is a case where depending on the airport, there is no distance restriction in regard to a running distance at the time of the ground run. However, in order to increase the number of airports that aircrafts can use, it is required to further shorten the running distance and it is necessary to consider another braking force that is applied to an aircraft.

The present disclosure has been made in view of such circumstances, and has an object to provide a braking force generation device, a wing, and an aircraft, in which it is possible to improve lift that is generated on an aircraft at the time of takeoff and landing and to increase a braking force at the time of ground run.

Solution to Problem

In order to solve the above problems, a braking force generation device of the present disclosure includes: a cross flow fan installed on a trailing edge side of a wing; a deflector installed above the cross flow fan and capable of being retracted or separated with respect to the wing; and a blocker door installed below the cross flow fan, rotating with one end side fixed to the wing as a center, and capable of being retracted or deployed with respect to the wing, in which the braking force generation device has a first mode in which the deflector and the blocker door are retracted with respect to the wing, and a second mode in which, in a state where a leading edge of the deflector is separated from the wing with a trailing edge being close to the wing and the blocker door is deployed, a first flow path is formed on a lower surface side of the deflector and fluid flows from a rear to a front of the wing via the cross flow fan from an opening on a blocker door side to an opening on a leading edge side of the deflector in the first flow path.

Advantageous Effects of Invention

According to the present disclosure, it is possible to improve lift that is generated on an aircraft at the time of takeoff and landing, and to increase a braking force at the time of ground run.

BRIEF DESCRIPTION OF DRAWINGS

FIG. 19 is a vertical sectional view showing the modification example of the braking force generation device according to the third embodiment of the present disclosure.

DESCRIPTION OF EMBODIMENTS

Figure 1:
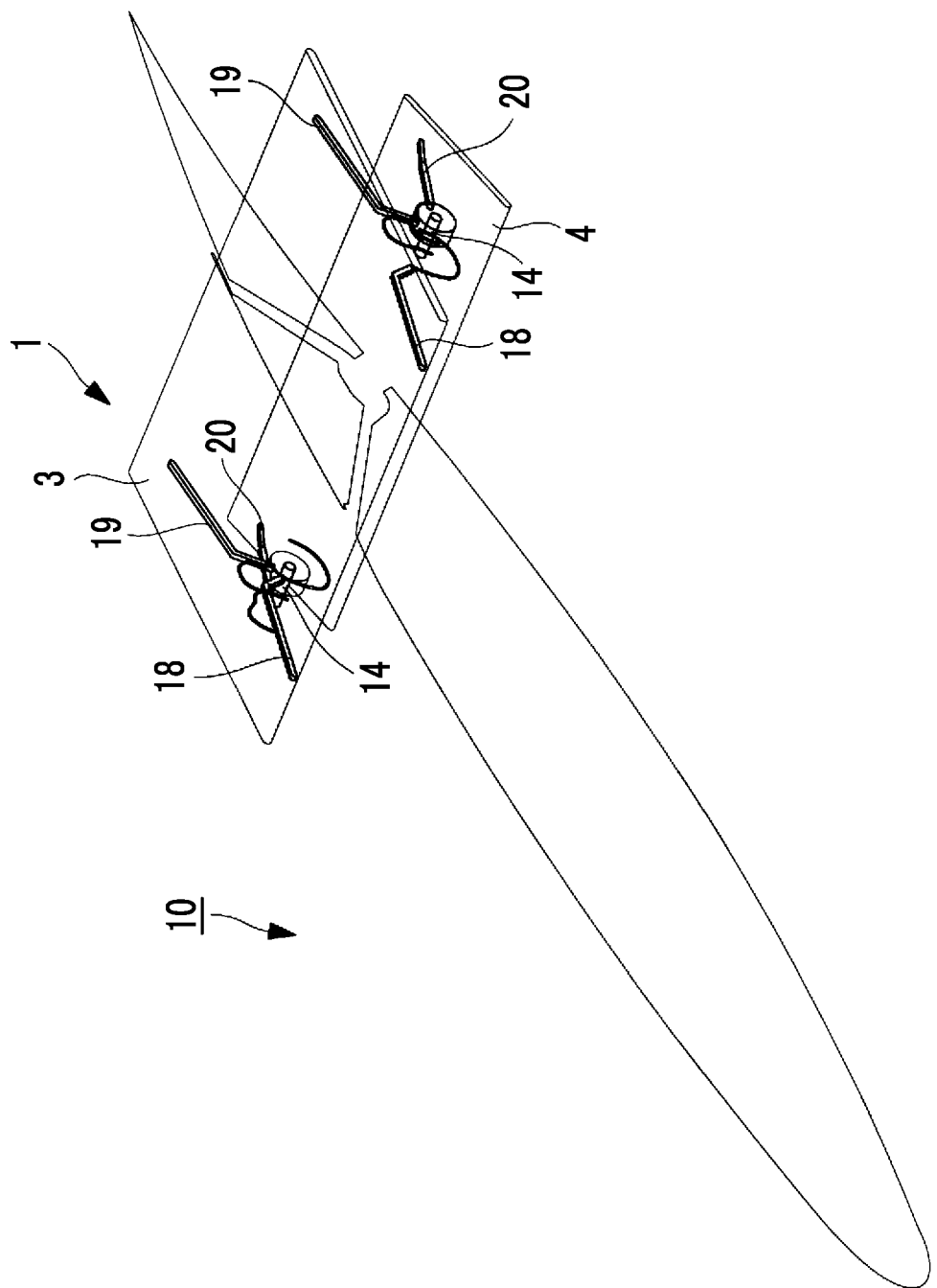
FIG. 1 is a schematic perspective view showing a braking force generation device and a wing according to a first embodiment of the present disclosure.

Hereinafter, embodiments according to the present disclosure will be described with reference to the drawings.

First Embodiment

Hereinafter, a braking force generation device 1 according to a first embodiment of the present disclosure will be described using FIGS. 1 to 5.

The braking force generation device 1 according to the present embodiment is applied to a wing 10 of an aircraft. The braking force generation device 1 includes a cross flow fan 2 that is installed, for example, at the rear of the inside of the wing 10, a deflector 3 that is installed on an upper surface side of the wing 10, and a blocker door 4 that is installed on a lower surface side of the wing 10.

The cross flow fan 2 is installed in a space serving as a flow path 11 or 12 (refer to FIGS. 4 and 5) that is formed inside the wing 10, and can send air sucked through an opening 11a or 12a on one side provided in the flow path 11 or 12 to the outside through an opening 11b or 12b on the other side provided in the flow path 11 or 12. An axial direction of the cross flow fan 2 is substantially parallel to a longitudinal direction of the wing 10, and the cross flow fan 2 forms a substantially uniform air flow along the longitudinal direction of the wing 10. The cross flow fan 2 rotates counterclockwise in the sectional views shown in FIGS. 4 and 5. That is, when focusing on an upper portion of the cross flow fan 2, a fan blade rotates from the rear toward the front of the wing 10, and when focusing on a lower portion, the fan blade rotates from the front toward the rear of the wing 10.

Figure 2:
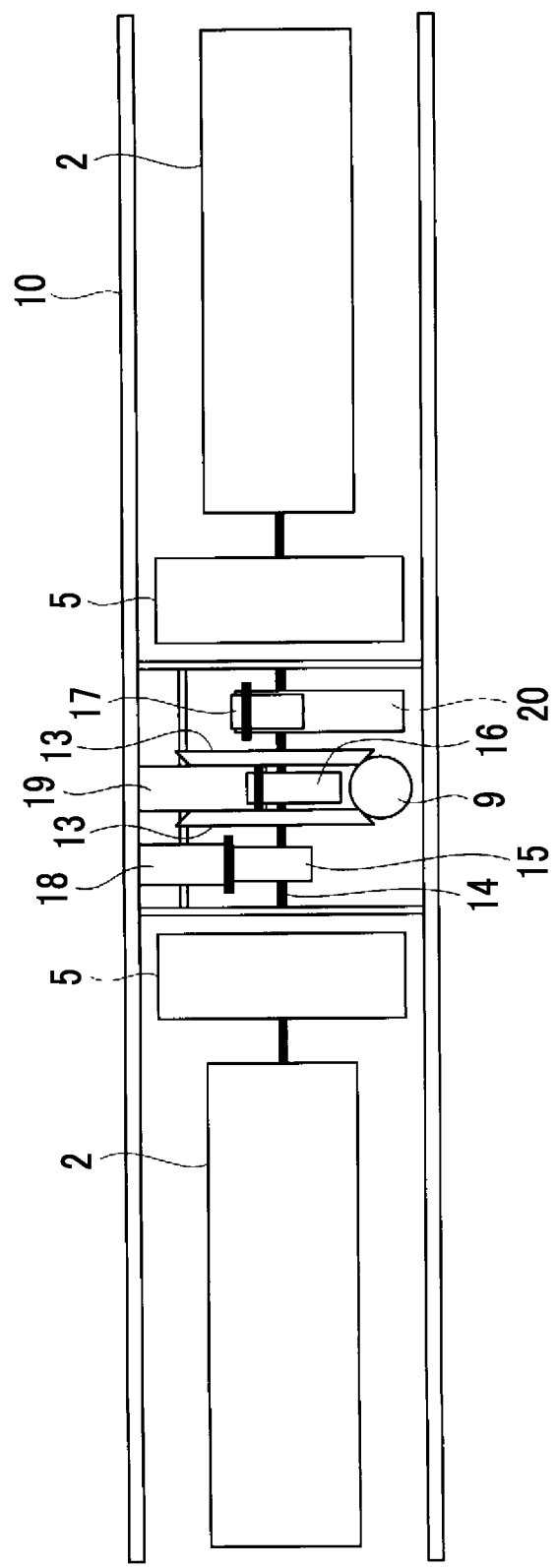
FIG. 2 is a vertical sectional view showing a drive unit of the braking force generation device and the wing according to the first embodiment of the present disclosure, and is a view when the wing is viewed from the front.

As shown in FIG. 2, the cross flow fan 2 is connected to an electric motor 5 and is rotationally driven by electric power. The braking force generation device 1 according to the present embodiment exhibits a high lift function or a reverse injection function by utilizing an air flow generated by the cross flow fan 2. Therefore, the performance of the high lift function or the reverse injection function is improved by electric power as compared with the related art.

The deflector 3 is installed above the cross flow fan 2. The deflector 3 is, for example, a plate-like component, and is a member long in one direction along the longitudinal direction of the wing 10. The deflector 3 can be retracted or separated with respect to the wing 10.

The blocker door 4 is installed below the cross flow fan 2. The blocker door 4 is, for example, a member having a wing-shaped cross section, and is a member long in one direction along the longitudinal direction of the wing 10. The deflector 3 and the blocker door 4 are installed to form a pair at positions facing each other with the cross flow fan 2 interposed between them. The blocker door 4 rotates with one end side fixed to the wing 10 as the center. The blocker door 4 is retracted with respect to the wing 10 when a tip 4a on the other end side of the blocker door 4 moves to the front of the wing 10, and conversely, is deployed to a position away from the wing 10 when the tip 4a moves to the rear of the wing 10.

Figure 3:
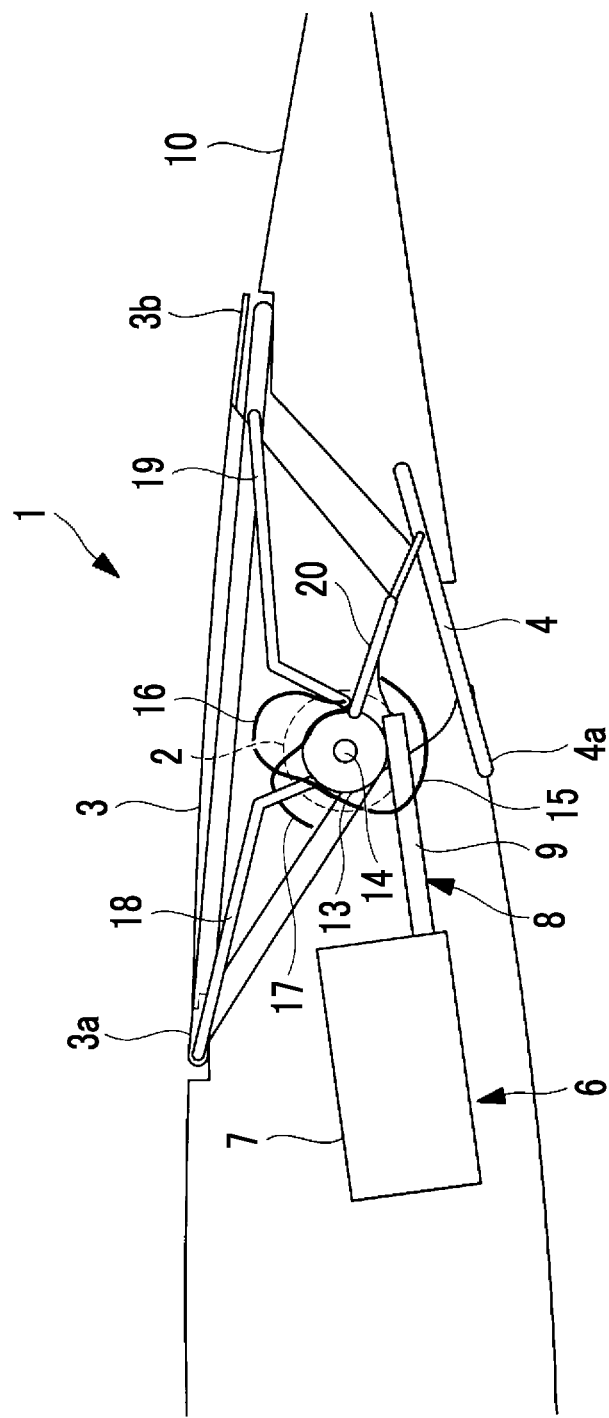
FIG. 3 is a vertical sectional view showing the braking force generation device and the wing according to the first embodiment of the present disclosure, and is a view when the wing is viewed from the side.

During cruise of the aircraft, as shown in FIG. 3, the deflector 3 and the blocker door 4 are at the disposition positions in a first mode and are retracted with respect to the wing 10. For example, both a leading edge 3a and a trailing edge 3b of the deflector 3 are located in or near a plane of the upper surface of the wing 10, and the deflector 3 is disposed along the upper surface of the wing 10. Further, the tip 4a of the blocker door 4 is located at the front, and the blocker door 4 is disposed along the lower surface of the wing 10. In this way, during cruise, the deflector 3 and the blocker door 4 do not reduce the speed during cruise of the aircraft.

Figure 4:
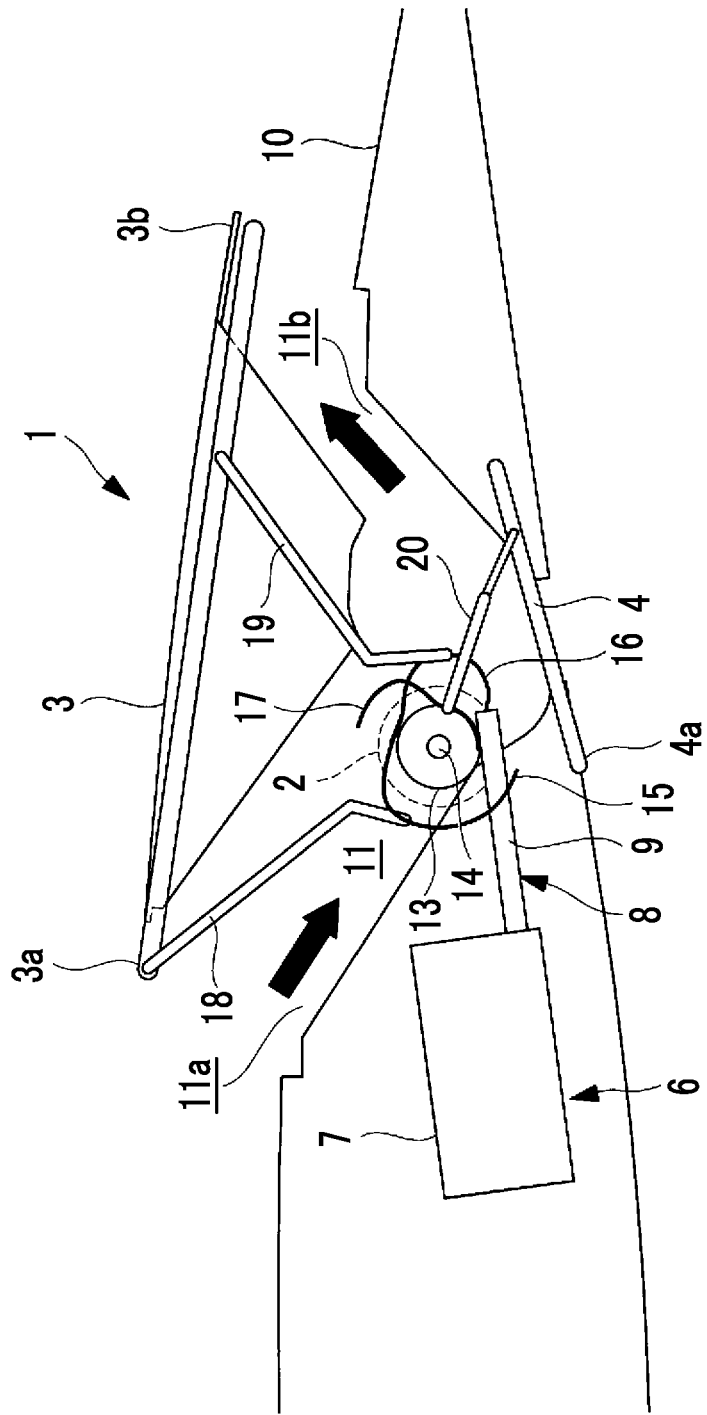
FIG. 4 is a vertical sectional view showing the braking force generation device and the wing according to the first embodiment of the present disclosure.

At the time of takeoff and landing, as shown in FIG. 4, the deflector 3 and the blocker door 4 are at the disposition positions in a third mode, both the leading edge 3a and the trailing edge 3b of the deflector 3 are separated from the wing 10, and the blocker door 4 is retracted to the wing 10. At this time, the flow path (second flow path) 11 is formed between the deflector 3, the wing 10, and the blocker door 4 on the lower surface side of the deflector 3. The cross flow fan 2 is installed in the middle of the flow path 11, and in the flow path 11, air flows from the front to the rear of the wing 10 via the cross flow fan 2. The air flowing along the upper surface of the wing 10 is supplied to the cross flow fan 2 through the front-side opening (gap) 11a formed between the deflector 3 and the wing 10, and the cross flow fan 2 sends the supplied air to the rear. The air sent from the cross flow fan 2 is blown to the outside through the rear-side opening (gap) 11b formed between the deflector 3 and the wing 10.

Based on the above, a large amount of air is sent to the cross flow fan 2 by the deflector 3 that is at the position separated from the wing 10. Then, the air flowing on the upper surface of the wing 10 and peeled from the wing 10 is sucked by the cross flow fan 2. In this way, since a peeling region on the upper surface of the wing 10 can be reduced and circulation around the wing 10 can be strengthened, it is possible to improve lift.

Figure 5:
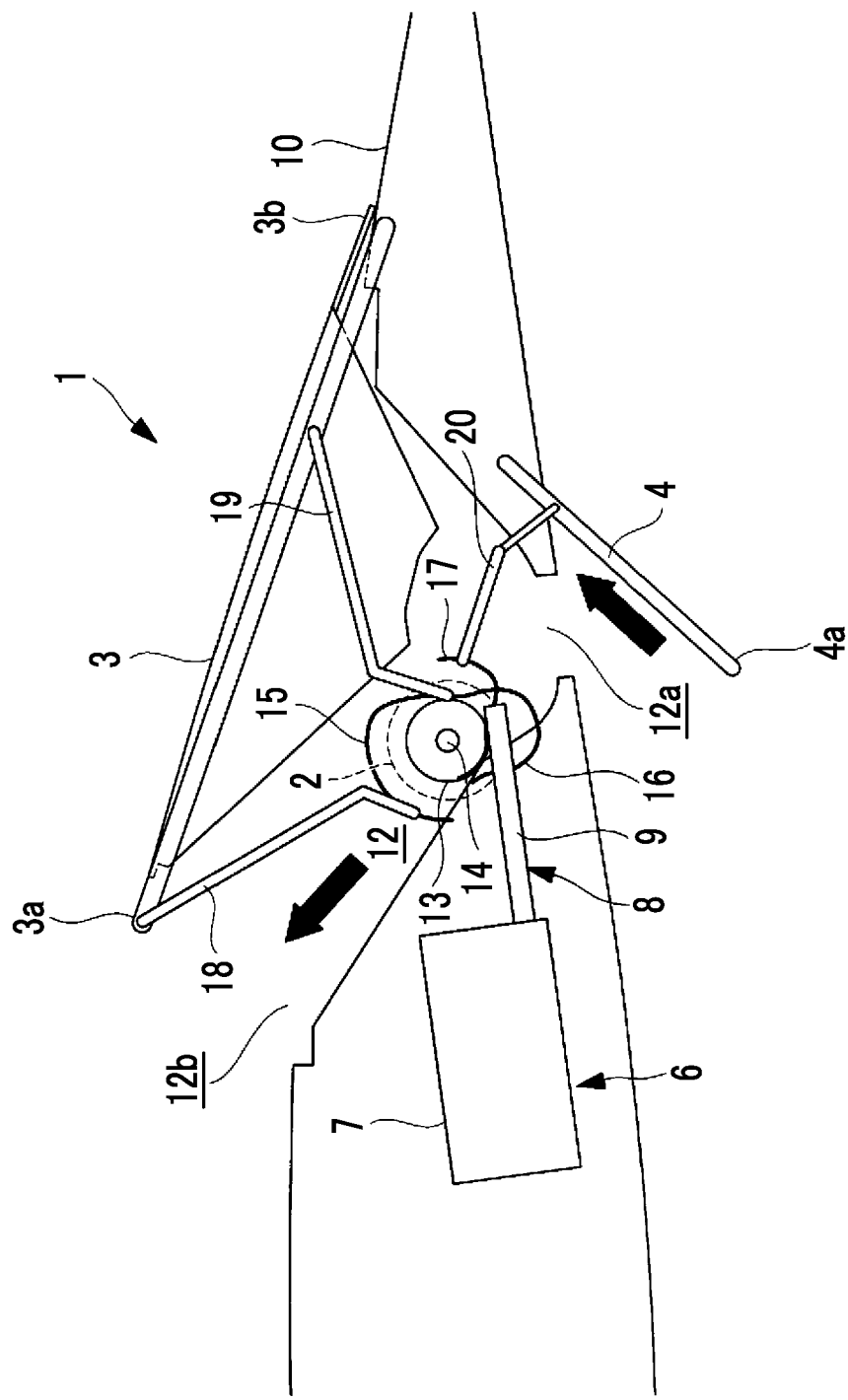
FIG. 5 is a vertical sectional view showing the braking force generation device and the wing according to the first embodiment of the present disclosure.

During ground run on a runway after landing, as shown in FIG. 5, the deflector 3 and the blocker door 4 are at the disposition position in a second mode, and the leading edge 3a of the deflector 3 is separated from the wing 10 with the trailing edge 3b being close to the wing 10, and the blocker door 4 is deployed. At this time, the flow path (first flow path) 12 is formed between the deflector 3 and the blocker door 4 on the lower surface side of the deflector 3. The cross flow fan 2 is installed in the middle of the flow path 12, and in the flow path 12, air flows from the rear to the front of the wing 10 via the cross flow fan 2. The air flowing along the lower surface of the wing 10 is supplied to the cross flow fan 2 through the rear-side opening (gap) 12a formed between the blocker door 4 and the wing 10, and the cross flow fan 2 sends the supplied air to the front. The air sent from the cross flow fan 2 is blown to the outside through the front-side opening (gap) 12b formed between the leading edge 3a of the deflector 3 and the wing 10.

Based on the above, a large amount of air is sent to the cross flow fan 2 by the blocker door 4 that is at the position where it is deployed from the wing 10. Then, since a flow direction of the air becomes a reverse direction from the rear to the front, the function as a reverse injection device is exhibited.

Next, a drive mechanism for the deflector 3 and the blocker door 4 will be described.

The drive mechanism for the deflector 3 and the blocker door 4 drives both the deflector 3 and the blocker door 4 in conjunction with each other via a single drive unit 6. The present disclosure is not limited to this example, and a drive unit may be installed at each of the deflector 3 and the blocker door 4 to independently drive the deflector 3 and the blocker door 4.

The driving force generated by the drive unit 6 is transmitted through, for example, a ball screw 7 and a worm gear mechanism 8 to rotate a rotary shaft 14 on which a plurality of cams 15, 16, and 17 are installed. The ball screw 7 rotates a cylindrical worm 9 provided at a tip around an axis, and the cylindrical worm 9 rotates a worm wheel 13 meshed with it. The rotary shaft 14 is installed at the center of the worm wheel 13, and the plurality of cams 15, 16, and 17 are disposed coaxially with the rotary shaft 14. The rotary shaft 14 and the plurality of cams 15, 16, and 17 rotate around the axis of the rotary shaft 14 with the rotation of the worm wheel 13.

A first link 18 is connected to a first cam 15. One end side of the first link 18 is connected to the leading edge 3a of the deflector 3, and the other end side of the first link 18 is connected to the first cam 15. The first cam 15 is rotated by the driving force generated by the drive unit 6, so that the leading edge 3a of the deflector 3 is retracted or separated with respect to the wing 10.

A second link 19 is connected to a second cam 16. One end side of the second link 19 is connected to the trailing edge 3b of the deflector 3, and the other end side of the second link 19 is connected to the second cam 16. The second cam 16 is rotated by the driving force generated by the drive unit 6, so that the trailing edge 3b of the deflector 3 is retracted or separated with respect to the wing 10.

A third link 20 is connected to a third cam 17. One end side of the third link 20 is connected to the blocker door 4, and the other end side of the third link 20 is connected to the third cam 17, and the third cam 17 is rotated by the driving force generated by the drive unit 6, so that the blocker door 4 is retracted or deployed with respect to the wing 10.

By the driving of the drive unit 6, the first cam 15, the second cam 16, and the third cam 17 are rotated, and the deflector 3 is disposed at each of the positions in the first mode, the second mode, and the third mode. Further, the blocker door 4 is also disposed at the disposition position in each mode in accordance with each disposition position in the first mode, the second mode, and the third mode of the deflector 3.

Figure 6:
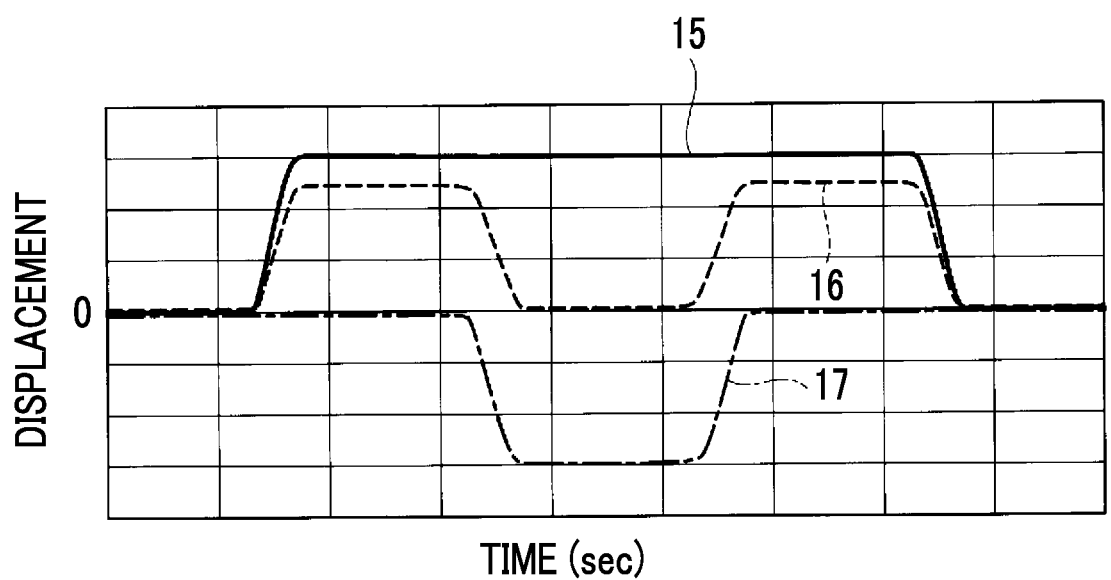
FIG. 6 is a graph showing displacement of cams of the braking force generation device according to the first embodiment of the present disclosure.
Figure 7:
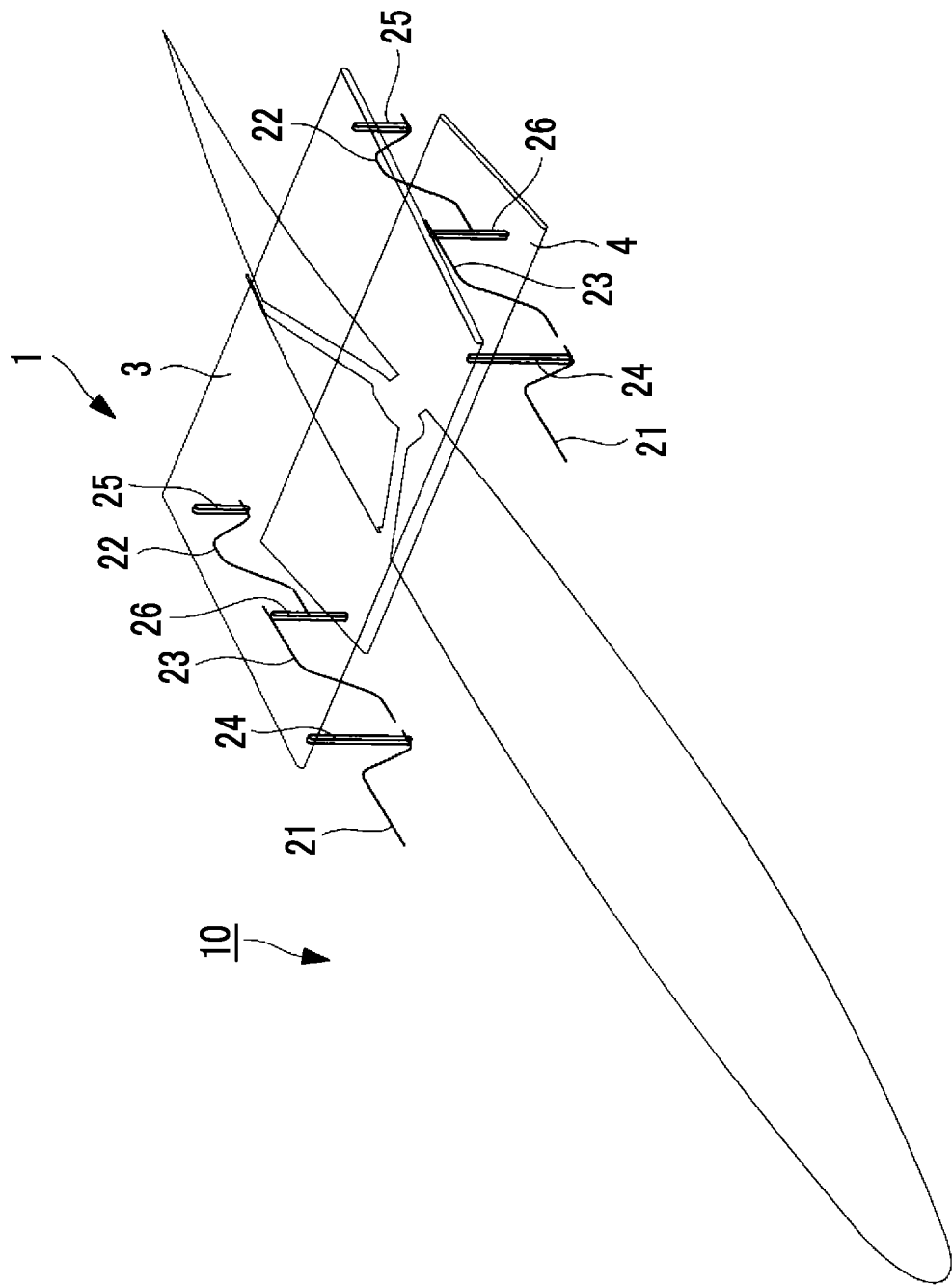
FIG. 7 is a schematic perspective view showing a first modification example of the braking force generation device and the wing according to the first embodiment of the present disclosure.

As shown in FIG. 6, the displacement amounts of the first cam 15, the second cam 16, and the third cam 17 change in conjunction with each other. In the first mode, the displacement amounts of the first cam 15, the second cam 16, and the third cam 17 are 0 (zero). In the third mode, the displacement amount of the first cam 15 and the second cam 16 is at its maximum, and the displacement amount of the third cam 17 is 0 (zero). In the second mode, the displacement amount of the first cam 15 and the third cam 17 is at its maximum, and the displacement amount of the second cam 16 is 0 (zero).

In the above embodiment, the mechanism in which the plurality of cams 15, 16, and 17 are disposed coaxially with the rotary shaft 14 and the rotary shaft 14 and the plurality of cams 15, 16, and 17 rotate around the axis of the rotary shaft 14 has been described. However, the present disclosure is not limited to this example.

As shown in FIGS. 7 to 10, in a first modification example, a plurality of guide grooves 21, 22, and 23 that move in a front-rear direction of the wing 10 are installed. The plurality of guide grooves 21, 22, and 23 are connected to each other and can be moved by the single drive unit 6. Links 24, 25, and 26 are respectively connected to the guide grooves 21, 22, and 23. For example, in the link 24 connected to the guide groove 21 installed in the foremost position, one end side of the link 24 is connected to the leading edge 3a of the deflector 3. In the link 25 connected to the guide groove 22 installed in the rearmost position, one end side of the link 25 is connected to the trailing edge 3b of the deflector 3. In the link 26 connected to the guide groove 23 installed in the middle, one end side of the link 26 is connected to the blocker door 4.

Figure 8:
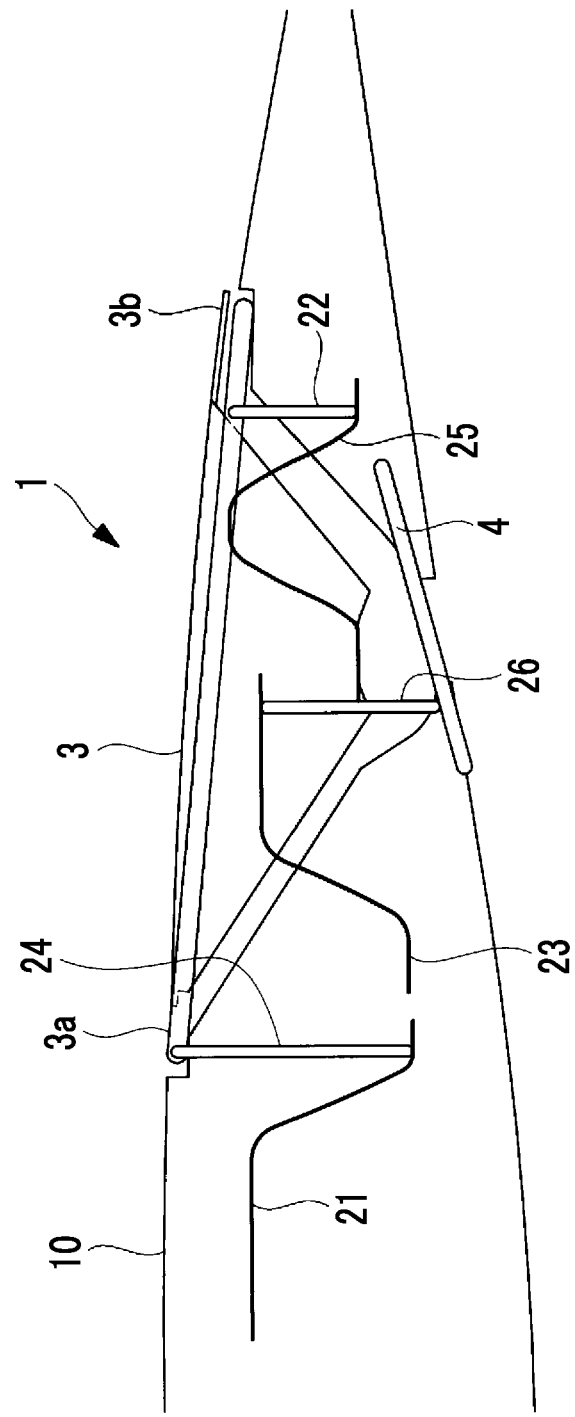
FIG. 8 is a vertical sectional view showing the first modification example of the braking force generation device and the wing according to the first embodiment of the present disclosure, and is a view when the wing is viewed from the side.
Figure 9:
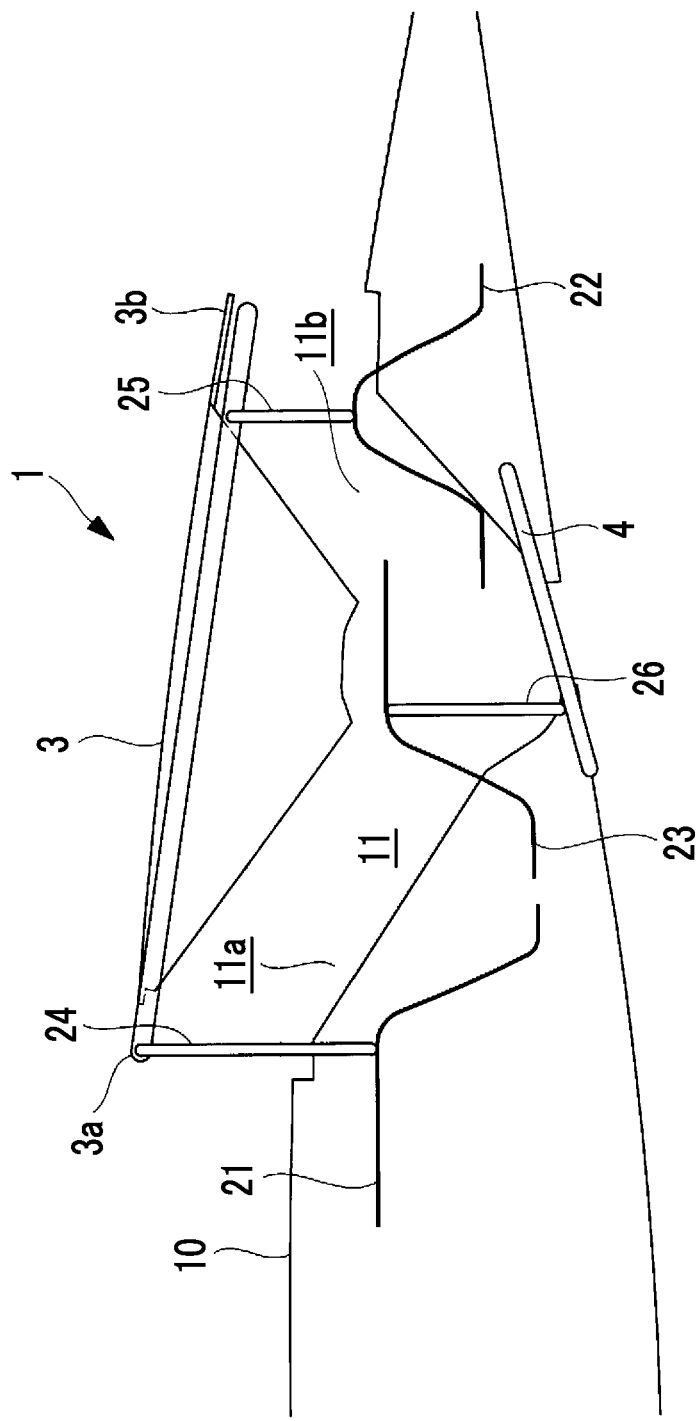
FIG. 9 is a vertical sectional view showing the first modification example of the braking force generation device and the wing according to the first embodiment of the present disclosure.
Figure 10:
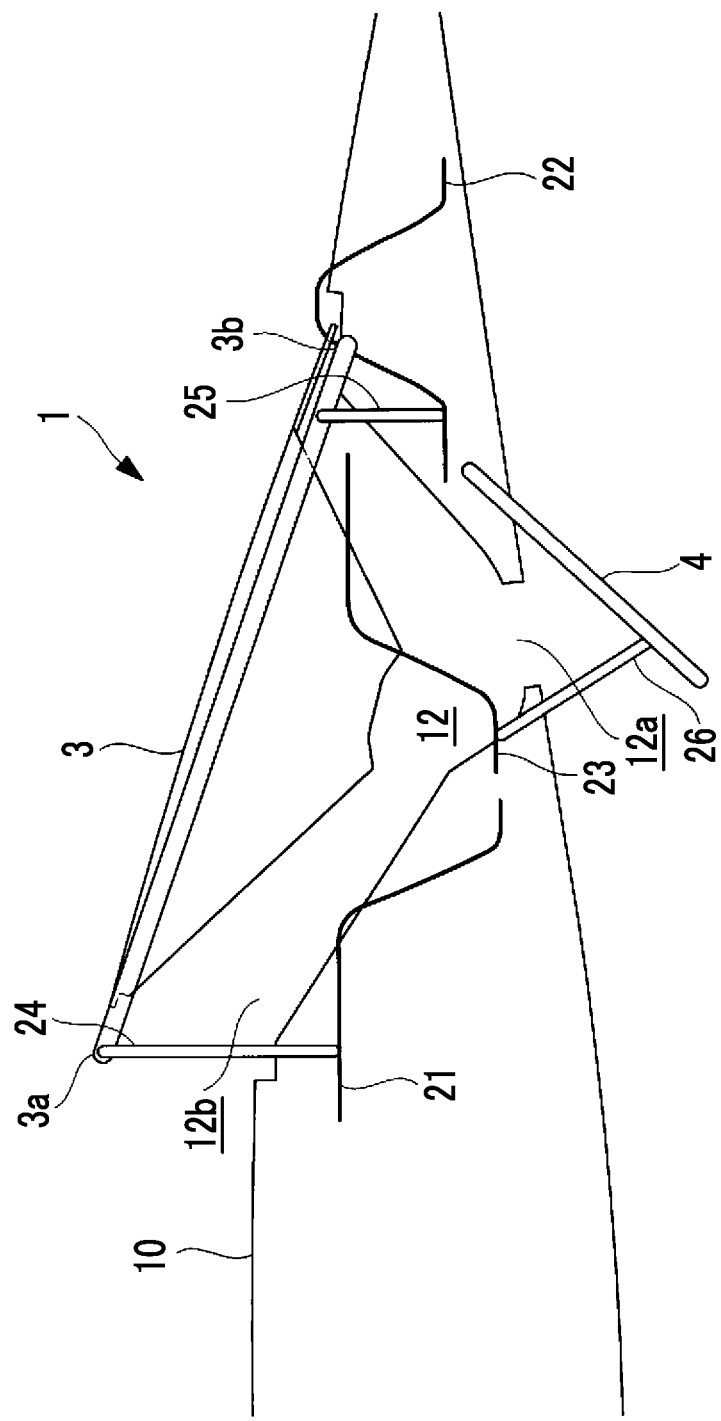
FIG. 10 is a vertical sectional view showing the first modification example of the braking force generation device and the wing according to the first embodiment of the present disclosure.

During cruise of the aircraft, as shown in FIG. 8, the deflector 3 and the blocker door 4 are at the disposition positions in the first mode and are retracted with respect to the wing 10. At the time of takeoff and landing, as shown in FIG. 9, the deflector 3 and the blocker door 4 are at the disposition positions in the third mode, both the leading edge 3a and the trailing edge 3b of the deflector 3 are separated from the wing 10, and the blocker door 4 is retracted to the wing 10. During ground run on the runway after landing, as shown in FIG. 10, the deflector 3 and the blocker door 4 are at the disposition positions in the second mode, and the leading edge 3a of the deflector 3 is separated from the wing 10 with the trailing edge 3b being close to the wing 10, and the blocker door 4 is deployed.

Figure 11:
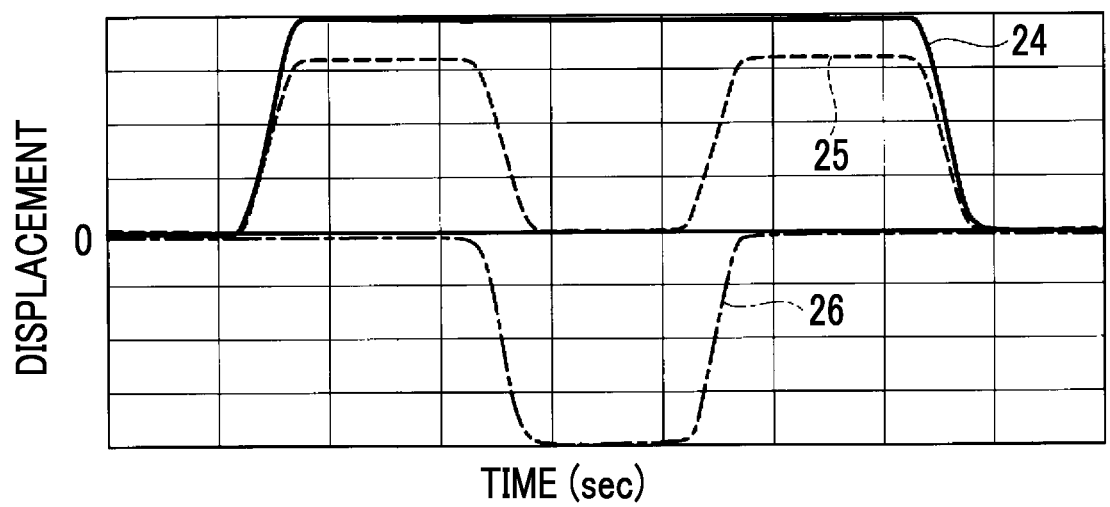
FIG. 11 is a graph showing displacement of links in the first modification example of the braking force generation device according to the first embodiment of the present disclosure.

The displacement amounts of the links 24, 25, and 26 respectively connected to the guide grooves 21, 22, and 23 are as shown in FIG. 11.

According to this modification example, all the guide grooves 21, 22, and 23 can be disposed on the same surface, and therefore, compared to the case where the plurality of cams 15, 16 and 17 are disposed on the single rotary shaft 14, it has the advantage that space along a length direction of the wing 10 can be saved and the flow of air is not easily obstructed. Further, unlike the cams 15, 16, and 17, there is no rotational movement, and therefore, it is possible to reliably move the links 24, 25, and 26.

Figure 12:
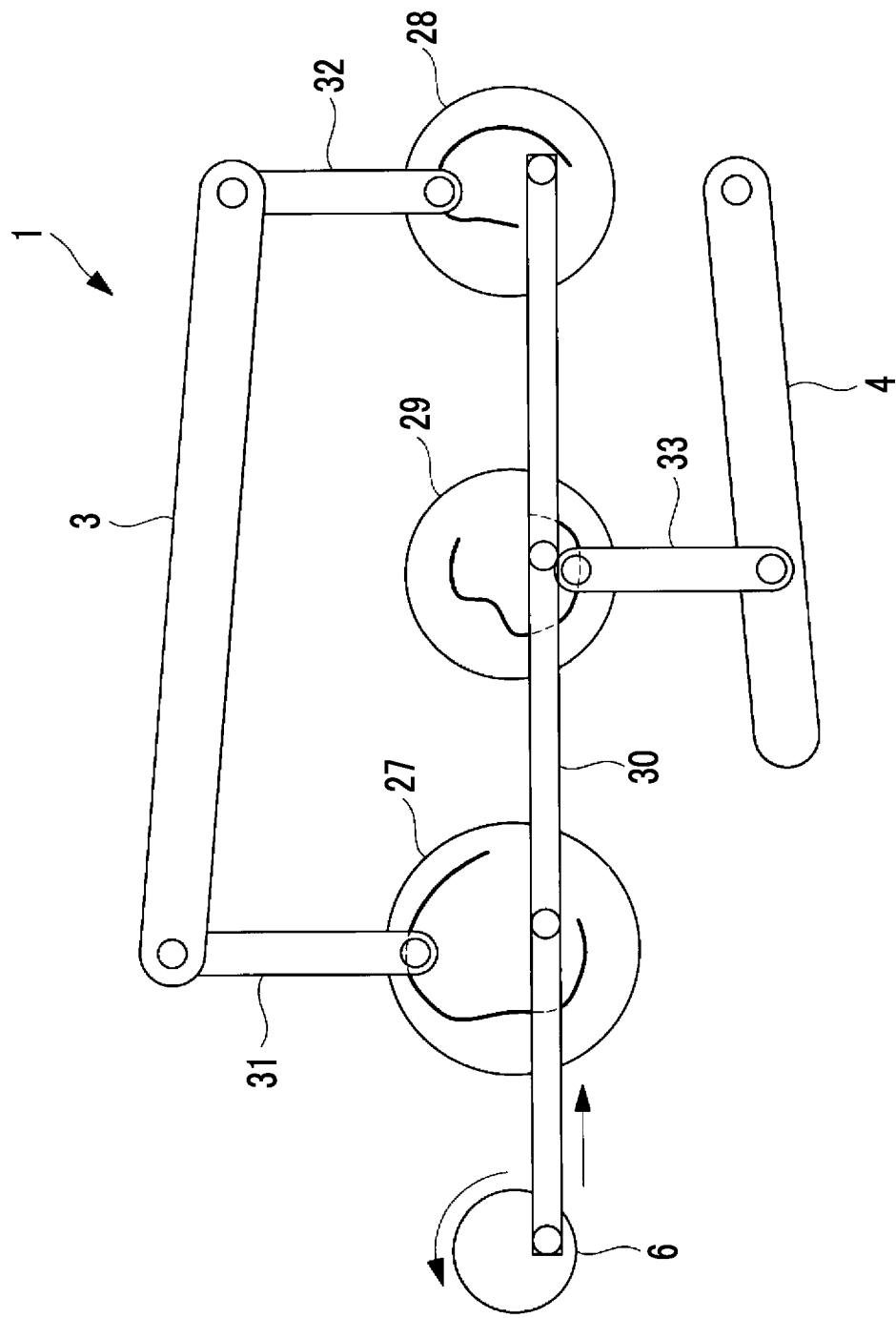
FIG. 12 is a vertical sectional view showing a second modification example of the braking force generation device according to the first embodiment of the present disclosure.

As shown in FIG. 12, in a second modification example, a plurality of cams 27, 28, 29 are disposed in the front-rear direction of the wing 10. The plurality of cams 27, 28, and 29 are connected to each other by a connecting rod 30, and can be rotated by the single drive unit 6 through the connecting rod 30. Links 31, 32, and 33 are respectively connected to the cams 27, 28, and 29. For example, in the link 31 connected to the cam 27 installed in the foremost position, one end side of the link 31 is connected to the leading edge 3a of the deflector 3. In the link 32 connected to the cam 28 installed in the rearmost position, one end side of the link 32 is connected to the trailing edge 3b of the deflector 3. In the link 33 connected to the cam 29 installed in the middle, one end side of the link 33 is connected to the blocker door 4.

According to this modification example, all the cams 27, 28, and 29 can be disposed on the same surface, and therefore, compared to the case where the plurality of cams 15, 16 and 17 are disposed on a single rotary shaft, it has the advantage that space along the length direction of the wing 10 can be saved and the flow of air is not easily obstructed.

Figure 13:
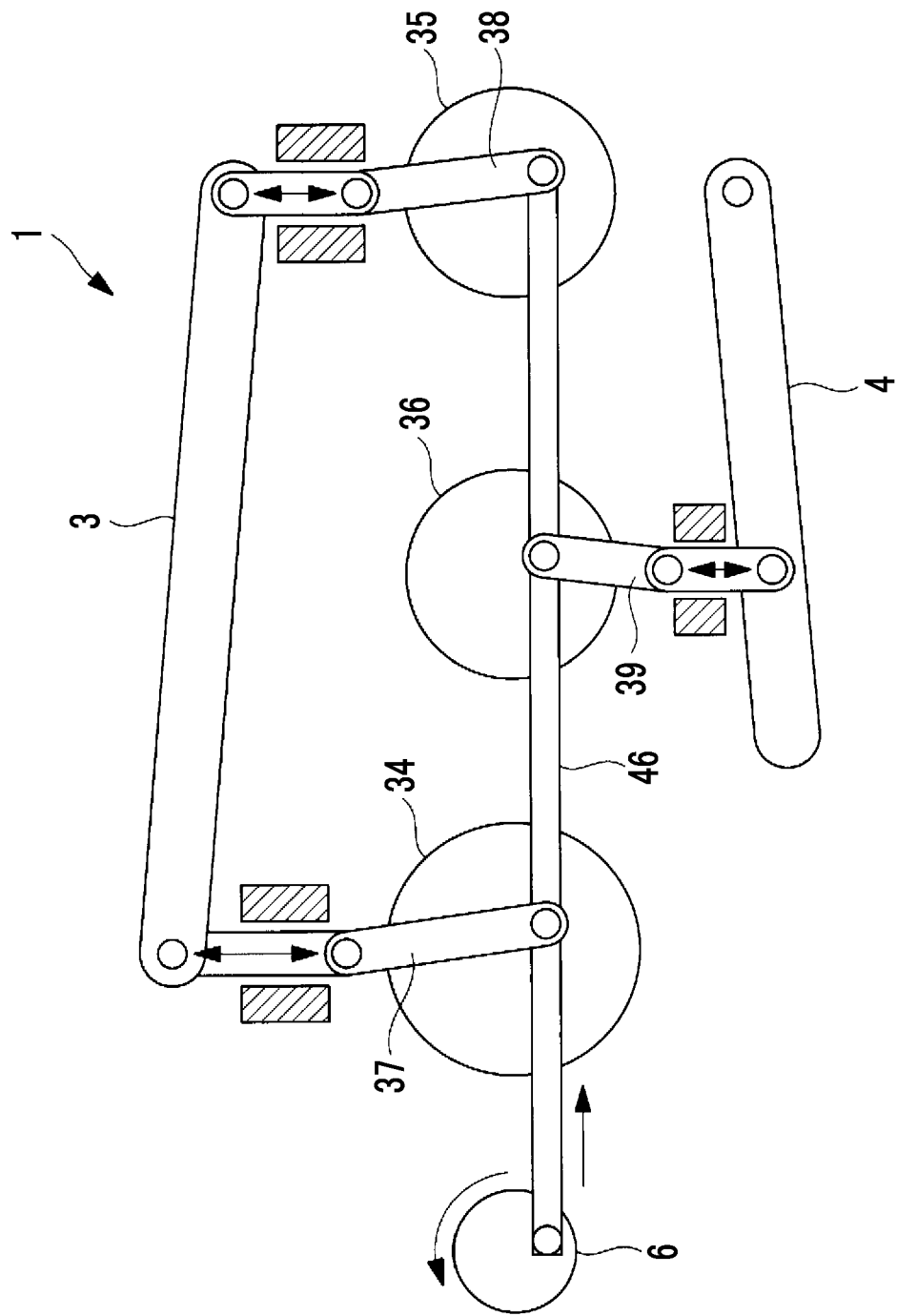
FIG. 13 is a vertical sectional view showing a third modification example of the braking force generation device according to the first embodiment of the present disclosure.

As shown in FIG. 13, in a third modification example, a crank mechanism is installed instead of a cam mechanism. A plurality of rotating plates 34, 35, and 36 are disposed in the front-rear direction of the wing 10. The plurality of rotating plates 34, 35, and 36 are connected to each other by a connecting rod 46, and can be rotated by the single drive unit 6 through the connecting rod 46. Links 37, 38, and 39 are respectively connected to the rotating plates 34, 35, and 36. However, unlike the case where the links 31, 32, and 33 move up and down along cam grooves, an up-and-down motion of each of the links 37, 38, and 39 caused by the rotational movement of the drive unit 6 is only one reciprocation with respect to one rotation, and therefore, the operation patterns of the deflector 3 and the blocker door 4 are limited.

Second Embodiment

Next, the braking force generation device 1 and the wing 10 according to a second embodiment of the present disclosure will be described using FIGS. 14 and 15. Detailed description of the configurations and operation and effects overlapping with those in the first embodiment will be omitted.

In this embodiment, a flow rate increasing device 40 is further installed on the lower surface of the wing 10. The flow rate increasing device 40 is, for example, an axial flow fan, or the like.

Figure 14:
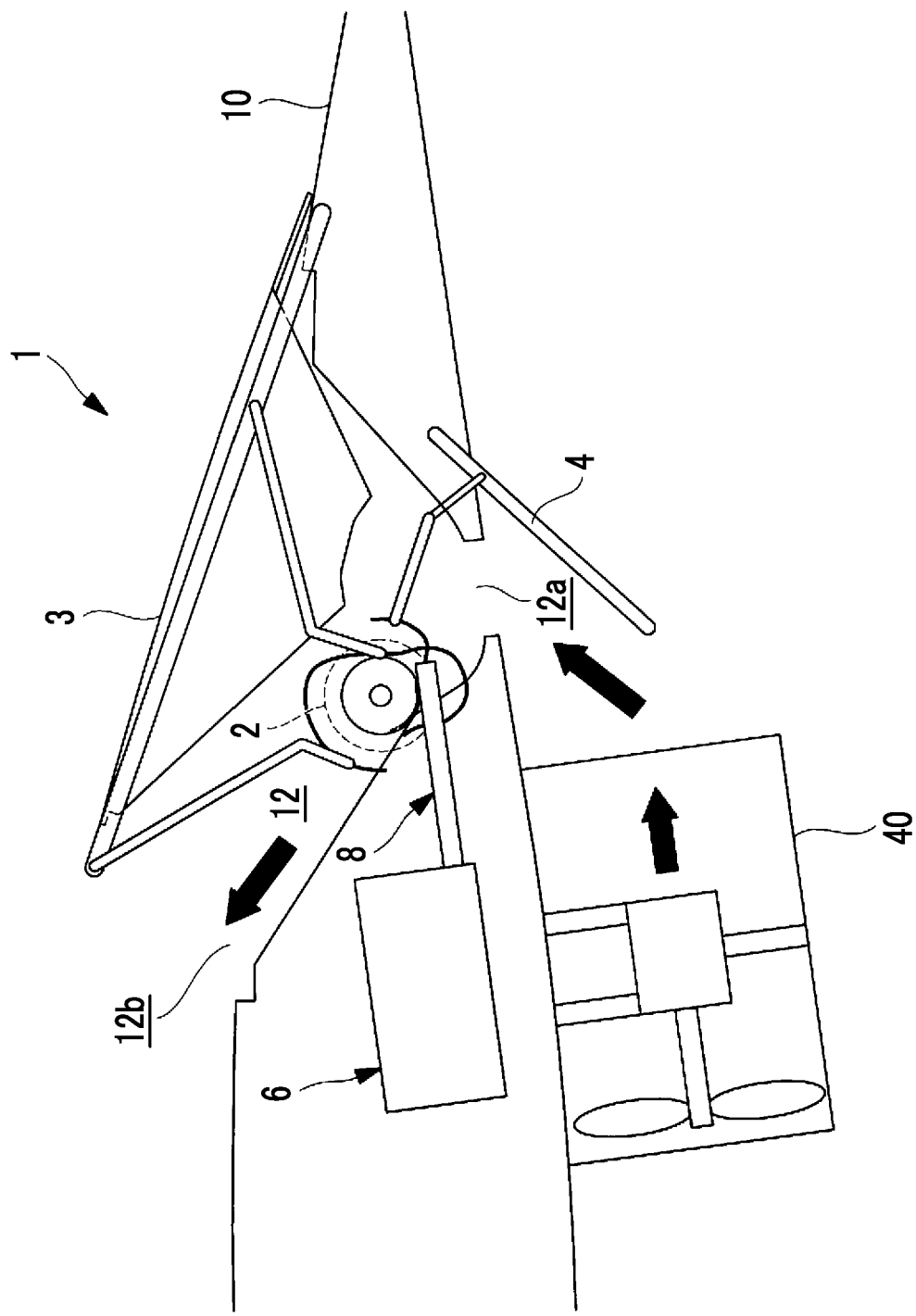
FIG. 14 is a vertical sectional view showing a braking force generation device according to a second embodiment of the present disclosure.

As shown in FIG. 14, the flow rate increasing device is installed in front of the blocker door 4 and supplies fluid from the front to the rear. In this way, when the blocker door 4 is deployed during ground run, fluid is sent from the flow rate increasing device 40 toward the blocker door 4. As a result, during ground run, a larger flow rate of fluid can be sent to the first flow path 12 from the lower surface side of the wing 10. That is, the air sent from the flow rate increasing device 40 is supplied to the cross flow fan 2 through the rear-side opening (gap) 12a formed between the blocker door 4 and the wing 10, and the cross flow fan 2 sends the supplied air to the front. The air sent from the cross flow fan 2 is blown to the outside through the front-side opening (gap) 12b formed between the leading edge 3a of the deflector 3 and the wing 10. Therefore, since a larger dynamic pressure is generated on the lower surface side than on the upper surface side, a sufficient dynamic pressure difference between the upper and lower surfaces can be obtained, so that the function as a reverse injection device can be reliably exhibited.

Figure 15:
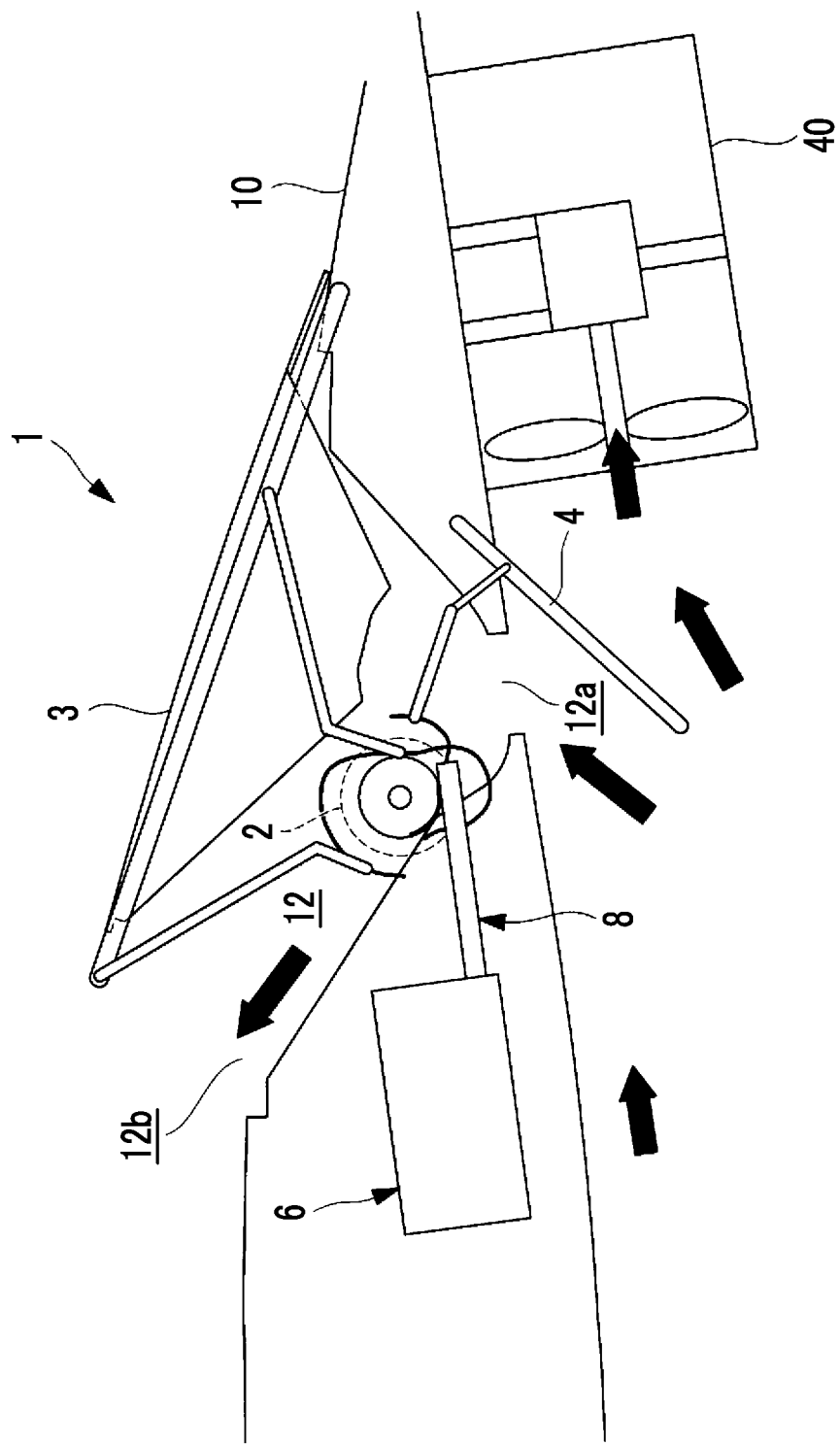
FIG. 15 is a vertical sectional view showing a modification example of the braking force generation device according to the second embodiment of the present disclosure.

The installation position of the flow rate increasing device 40 is not limited to the front of the blocker door 4, and may be installed behind the blocker door 4, as shown in FIG. 15. The flow rate increasing device 40 draws in fluid flowing behind the blocker door 4. As a result, during ground run, a larger flow rate of fluid can be sent to the first flow path 12 from the lower surface side of the wing 10. Therefore, since a larger dynamic pressure is generated on the lower surface side than on the upper surface side, a sufficient dynamic pressure difference between the upper and lower surfaces can be obtained, so that the function as a reverse injection device can be reliably exhibited.

Further, during cruise of an aircraft, the flow rate increasing device 40 sends the fluid flowing on the lower surface of the wing 10 from the front to the rear, and therefore, the resistance on the lower surface of the wing is reduced, so that the function as boundary layer control is exhibited.

Third Embodiment

Next, the braking force generation device 1 and the wing 10 according to a third embodiment of the present disclosure will be described using FIGS. 16 to 19. Detailed description of the configurations and operation and effects overlapping with those in the first and second embodiments will be omitted.

In the first and second embodiments, the example in which high lift is generated by the deflector 3 of the braking force generation device 1 alone at the time of takeoff and landing of an aircraft has been described. However, the present disclosure is not limited to this example.

Figure 16:
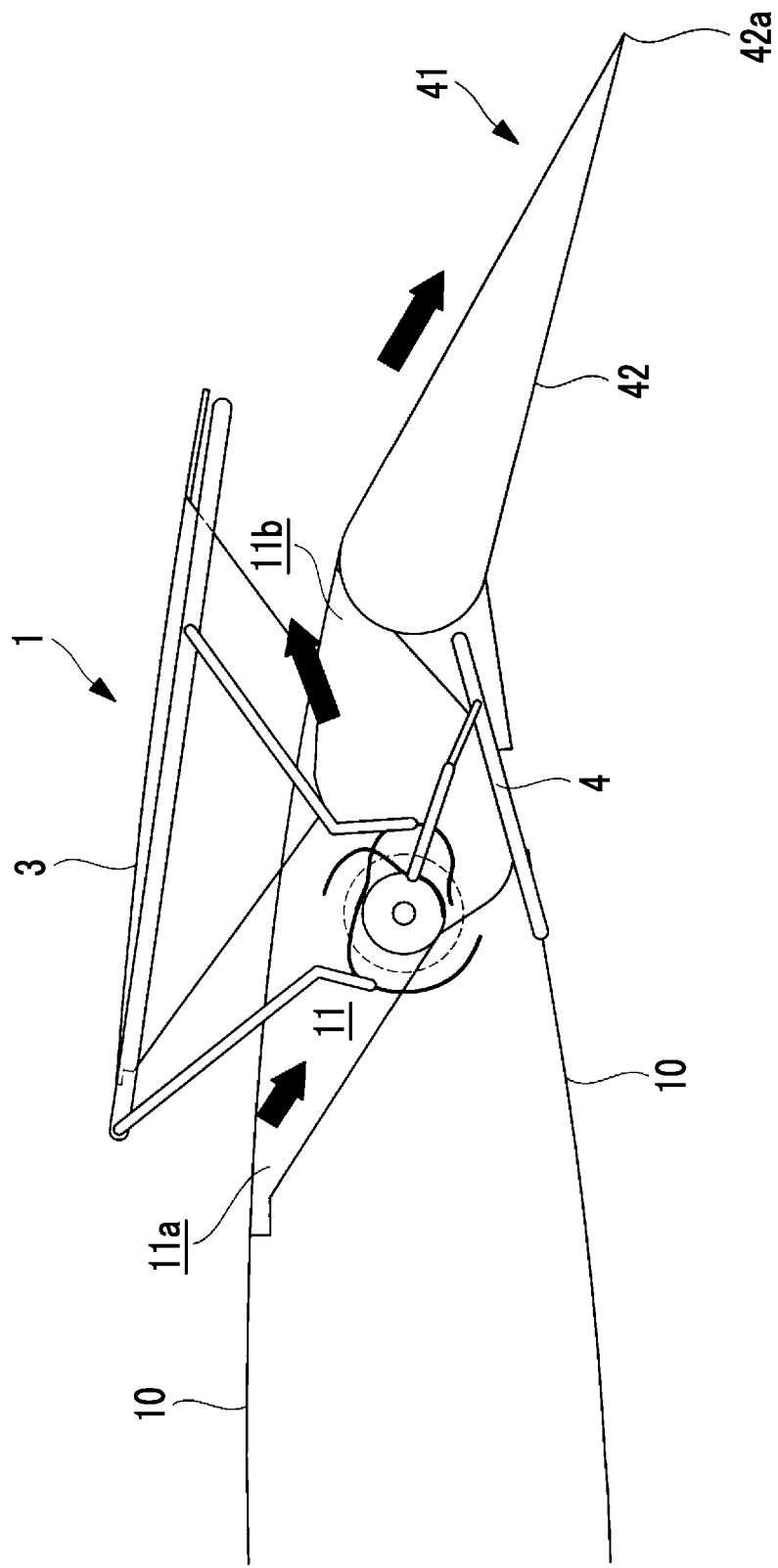
FIG. 16 is a vertical sectional view showing a braking force generation device according to a third embodiment of the present disclosure.
Figure 17:
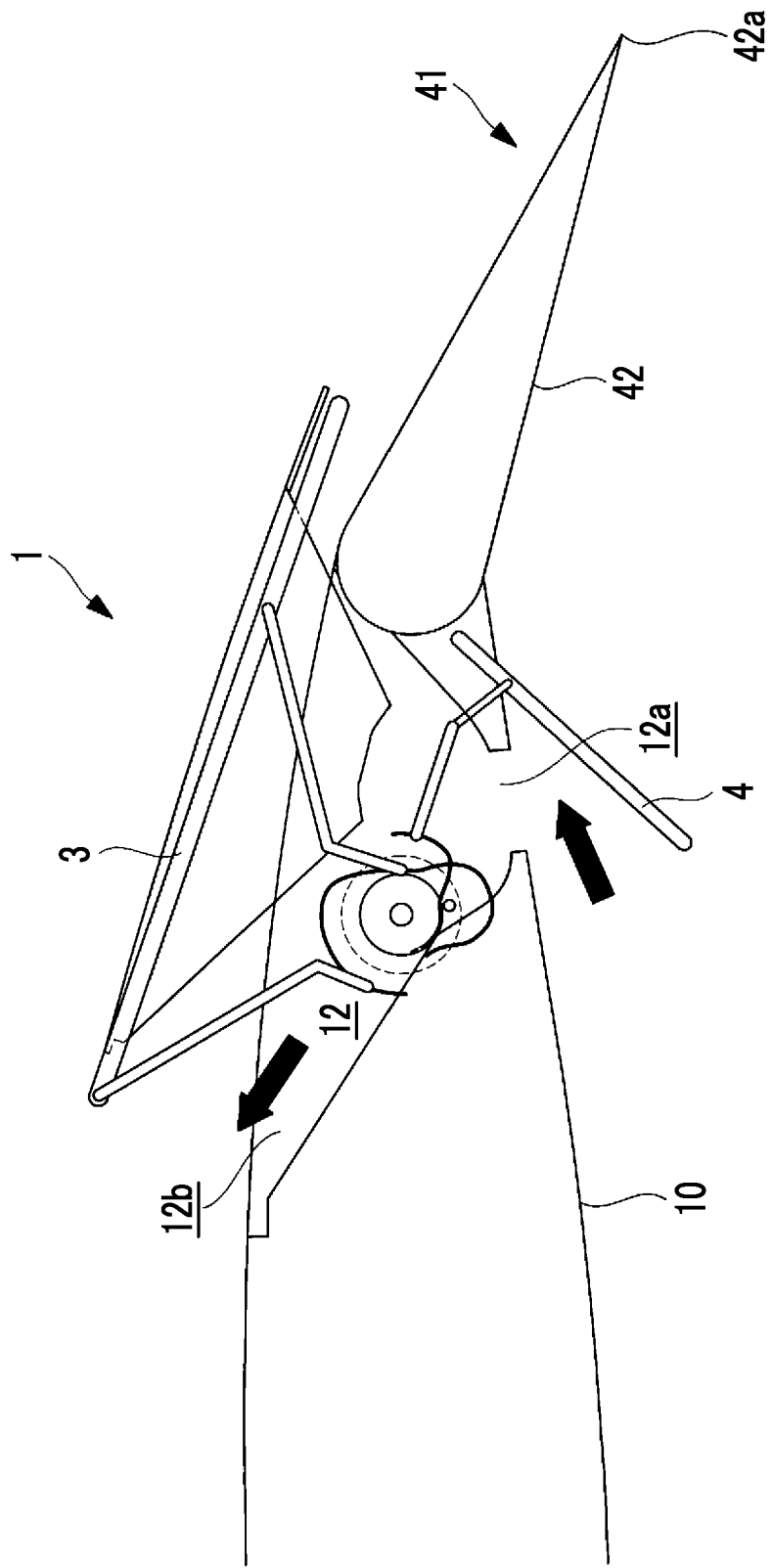
FIG. 17 is a vertical sectional view showing the braking force generation device according to the third embodiment of the present disclosure.

For example, as shown in FIGS. 16 and 17, in the wing 10, a high lift device 41 of the related art, for example, a trailing edge flap 42 may be installed at the trailing edge of the wing 10. For example, as shown in FIG. 16, at the time of takeoff and landing, a tip 42a of the trailing edge flap 42 of the high lift device 41 turns downward, so that a high lift function is exhibited. The air that is sent from the rear of the deflector 3 suppresses peeling on an upper surface of the high lift device 41. The high lift device 41 is used together with the deflector 3 according to the present embodiment, so that larger lift can be obtained. In a case of exhibiting the reverse injection function, as shown in FIG. 17, the blocker door 4 is deployed, as in the case described in the first embodiment, and air is led to the flow path 12.

Figure 18:
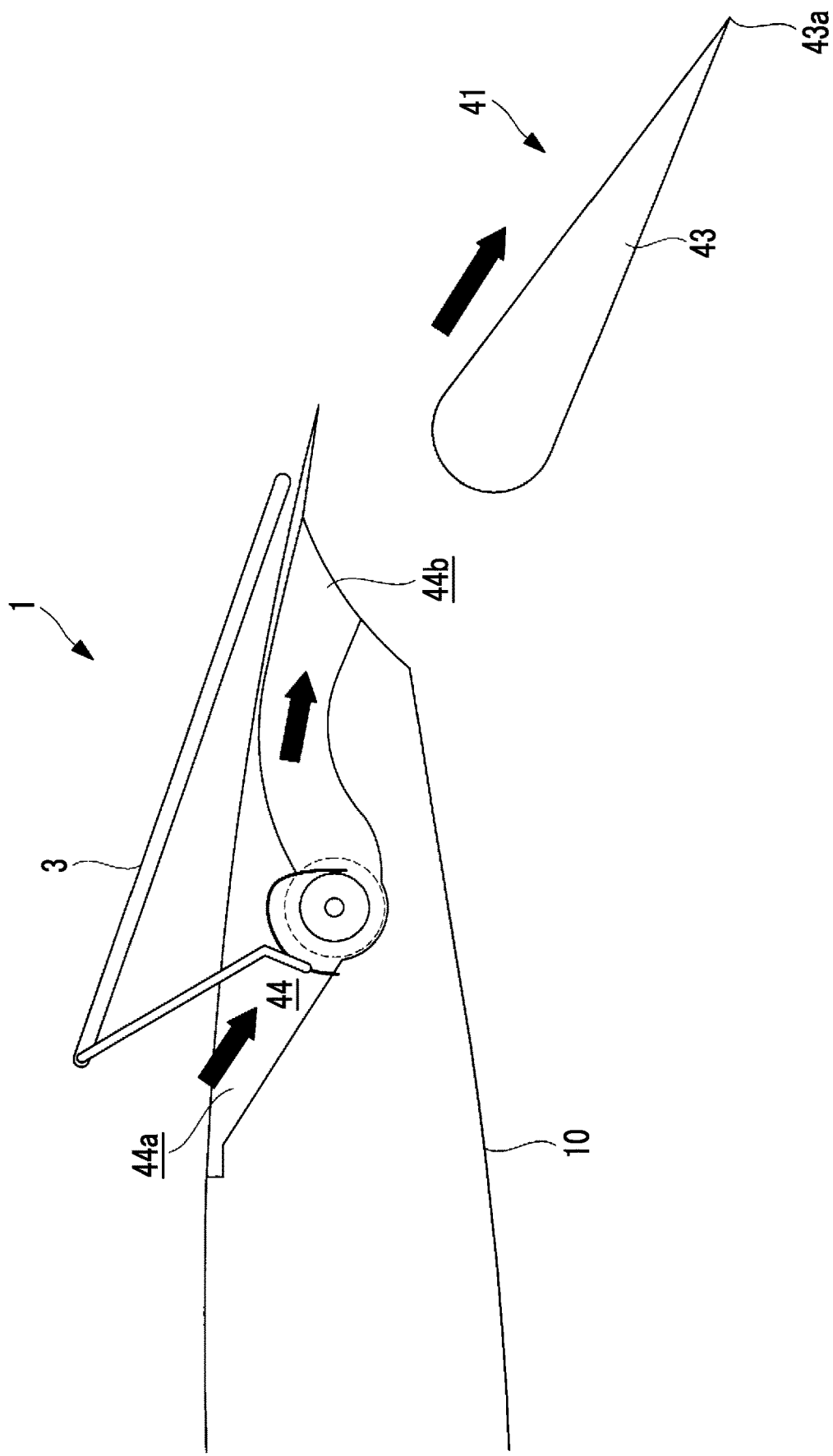
FIG. 18 is a vertical sectional view showing a modification example of the braking force generation device according to the third embodiment of the present disclosure.

Further, as shown in FIGS. 18 and 19, at the time of takeoff and landing, a trailing edge flap 43 that is installed at the trailing edge of the wing 10 may be separated from the wing 10 to form a gap between the wing 10 and the trailing edge flap 43. In this case, as shown in FIG. 18, at the time of takeoff and landing, the leading edge 3a of the deflector 3 is separated from the wing 10 with the trailing edge 3b of the deflector 3 being close to the wing 10. At this time, a flow path (second flow path) 44 is formed below the deflector 3. The flow path 44 is formed between a front opening (gap) 44a formed between the wing 10 and the deflector 3 and an opening 44b on the trailing edge flap 43 side of the wing 10. The opening 44b is formed at an intermediate portion between the upper surface and the lower surface of the wing 10 on a back surface of the wing 10.

The cross flow fan 2 is installed in the middle of the flow path 44, and air flows through the flow path 44 from the front to the rear of the wing 10. The air flowing along the upper surface of the wing 10 is supplied to the cross flow fan 2 through the front-side opening 44a formed between the deflector 3 and the wing 10, and the cross flow fan 2 sends the supplied air to the rear. The air sent from the cross flow fan 2 is blown to the outside through the rear-side opening 44b formed at the trailing edge of the wing 10.

Based on the above, a large amount of air is sent to the cross flow fan 2 by the deflector 3 that is at the position separated from the wing 10. Then, the air flowing on the upper surface of the wing 10 and peeled from the wing 10 is sucked by the cross flow fan 2. Further, the air blown out through the opening 44b formed at the trailing edge of the wing 10 flows on an upper surface of the trailing edge flap 43. In this way, since a peeling region on the upper surface of the wing 10 can be reduced and circulation around the wing 10 can be strengthened, it is possible to improve lift.

In order to exhibit the reverse injection function during ground run on the runway after landing, as shown in FIG. 19, the trailing edge flap 43 is used instead of the blocker door 4 of the first embodiment. During the ground run, as shown in FIG. 19, in the deflector 3, the leading edge 3a of the deflector 3 is separated from the wing 10 with the trailing edge 3b being close to the wing 10, and the tip 43a of the trailing edge flap 43 is moved frontward below the wing 10. At this time, a flow path (first flow path) 45 is formed between the deflector 3 and the trailing edge flap 43 on the lower surface side of the deflector 3.

The cross flow fan 2 is installed in the middle of the flow path 45, and air flows through the flow path 45 from the rear to the front of the wing 10. The air flowing along the lower surface of the wing 10 is supplied to the cross flow fan 2 through an opening 45*a* formed in the trailing edge of the wing 10 and in the intermediate portion between the upper surface and the lower surface of the wing 10 on the back surface of the wing 10, and the cross flow fan 2 sends the supplied air to the front. The air sent from the cross flow fan 2 is blown to the outside through a front-side opening 45*b* formed between the leading edge 3*a* of the deflector 3 and the wing 10.

Based on the above, a large amount of air is sent to the cross flow fan 2 by the trailing edge flap 43 whose tip 43*a* has been moved frontward below the wing 10. Then, since the flow direction of the air becomes a reverse direction from the rear to the front, the function as a reverse injection device is exhibited.

The braking force generation device, the wing, and the aircraft described in each of the embodiments described above are understood as follows, for example.

The braking force generation device (1) according to the present disclosure includes: a cross flow fan (2) installed on the trailing edge side of a wing (10); a deflector (3) installed above the cross flow fan and capable of being retracted or separated with respect to the wing; and a blocker door (4) installed below the cross flow fan, rotating with one end side fixed to the wing as the center, and capable of being retracted or deployed with respect to the wing, in which the device has a first mode in which the deflector and the blocker door are retracted with respect to the wing, and a second mode in which, in a state where a leading edge (3*a*) of the deflector is separated from the wing with a trailing edge (3*b*) being close to the wing and the blocker door is deployed, a first flow path (12) is formed on the lower surface side of the deflector and fluid flows from the rear to the front of the wing via the cross flow fan from an opening (12*a*) on a blocker door side to an opening (12*b*) on a leading edge side of the deflector in the first flow path.

According to this configuration, the deflector installed above the cross flow fan can be retracted or separated with respect to the wing, and the blocker door installed below the cross flow fan can rotate with one end fixed to the wing as the center and can be retracted or opened with respect to the wing. In the first mode, the deflector is retracted with respect to the wing and the blocker door is retracted with respect to the wing, and during cruise, the deflector and the blocker door are disposed at positions where they do not reduce the speed during flight.

In the second mode, in a state where the leading edge of the deflector is separated from the wing with the trailing edge being close to the wing and the blocker door is deployed, the first flow path is formed in which fluid flows from the rear to the front from the blocker door side to the leading edge side of the deflector. As a result, since the flow direction of the fluid becomes a reverse direction from the rear to the front, the function as a reverse injection device is exhibited.

In the braking force generation device according to the present disclosure, the device may further have a third mode in which, in a state where the leading edge and the trailing edge of the deflector are separated from the wing and the blocker door is retracted, a second flow path (11) is formed on the lower surface side of the deflector and fluid flows from the front to the rear of the wing via the cross flow fan from an opening (11*a*) on the leading edge side of the deflector to an opening (11*b*) on the trailing edge side in the second flow path.

According to this configuration, in the third mode, in a state where the leading edge and the trailing edge of the deflector are separated from the wing and the blocker door is retracted to the wing, the second flow path in which fluid flows from the front to the rear is formed on the lower surface side of the deflector. As a result, the fluid flowing on the upper surface of the wing is sucked by the cross flow fan, so that the peeling region on the upper surface of the wing can be reduced and the circulation around the wing can be strengthened. Therefore, it is possible to improve lift.

In the braking force generation device according to the present disclosure, the device may further include: a drive unit (6); a first cam (15) that is rotated by a driving force generated by the drive unit and to which the other end side of a first link (18) whose one end side is connected to the leading edge of the deflector is connected; and a second cam (16) that is rotated by the driving force generated by the drive unit and to which the other end side of a second link (19) whose one end side is connected to the trailing edge of the deflector is connected.

According to this configuration, one end side of the first link is connected to the leading edge of the deflector, the other end side of the first link is connected to the first cam, and the leading edge of the deflector is retracted or separated with respect to the wing by the rotation of the first cam by the driving force generated by the drive unit. Further, one end side of the second link is connected to the trailing edge of the deflector, the other end side of the second link is connected to the second cam, and the trailing edge of the deflector is retracted or separated with respect to the wing by the rotation of the second cam by the driving force generated by the drive unit. Based on the above, both the first cam and the second cam are rotated by the driving of the drive unit, so that the deflector is disposed at each of the positions in the first mode, the second mode, and the third mode.

In the braking force generation device according to the present disclosure, the device may further include: a third cam (17) that is rotated by the driving force generated by the drive unit and to which the other end side of a third link (20) whose one end side is connected to the blocker door is connected.

According to this configuration, one end side of the third link is connected to the blocker door, the other end side of the third link is connected to the third cam, and the blocker door is retracted or deployed with respect to the wing by the rotation of the third cam by the driving force generated by the drive unit. The third cam is rotated together with the first cam and the second cam by the driving of the drive unit, so that the blocker door is also disposed at the disposition positions in each mode in accordance with the disposition position in each of the first mode, the second mode, and the third mode of the deflector.

The wing (10) according to the present disclosure includes the braking force generation device (1) described above.

In the wing according to the present disclosure, the wing may further include: a flow rate increasing device (40) installed in front of the blocker door to supply fluid from the front to the rear.

According to this configuration, since the flow rate increasing device supplies the fluid from the front to the rear and the flow rate increasing device is disposed in front of the blocker door, the fluid is sent from the flow rate increasing device toward the deployed blocker door. As a result, in the second mode, a larger flow rate of fluid can be sent to the first flow path from the lower surface side of the wing.

In the wing according to the present disclosure, the wing may further include: a flow rate increasing device (40) installed behind the blocker door to supply fluid from the front to the rear.

According to this configuration, since the flow rate increasing device supplies the fluid from the front to the rear and the flow rate increasing device is disposed behind the blocker door, the flow rate increasing device draws in the fluid flowing behind the blocker door. As a result, in the second mode, a larger flow rate of fluid can be sent to the first flow path. Further, in the first mode, since the flow rate increasing device sends the fluid flowing on the lower surface of the wing from the front to the rear, the resistance on the lower surface of the wing is reduced, so that the function as the boundary layer control is exhibited.

In the wing according to the present disclosure, the wing may further include: a high lift device (41) installed behind the blocker door.

According to this configuration, the air that is sent from the rear of the deflector suppresses the peeling on the upper surface of the high lift device. The high lift device is used together with the deflector according to the present embodiment, so that larger lift can be obtained.

The wing (10) according to the present disclosure includes: a cross flow fan (2) installed on the trailing edge side of the wing; a deflector (3) installed above the cross flow fan and capable of being retracted or separated with respect to the wing; and a trailing edge flap (43) installed below the cross flow fan, rotating with one end side fixed to the wing as the center, and capable of being retracted or deployed with respect to the wing, in which the wing has a first mode in which the deflector is retracted with respect to the wing, and a second mode in which, in a state where a leading edge (3a) of the deflector is separated from the wing with a trailing edge (3b) being close to the wing and a tip of the trailing edge flap is moved frontward, a first flow path (45) is formed on the lower surface side of the deflector and fluid flows from the rear to the front of the wing via the cross flow fan from an opening (45a) on the trailing edge flap side to an opening (45b) on the leading edge side of the deflector in the first flow path.

In the wing according to the present disclosure, the wing may further have a third mode in which, in a state where the leading edge of the deflector is separated from the wing with the trailing edge being close to the wing, a second flow path (44) is formed on the lower surface side of the deflector and fluid flows from the front to the rear of the wing via the cross flow fan from an opening (44a) on the leading edge side of the deflector to an opening (44b) on the trailing edge flap side in the second flow path.

According to this configuration, the deflector installed above the cross flow fan can be retracted or separated with respect to the wing, and the trailing edge flap installed below the cross flow fan can rotate with one end side fixed to the wing as the center to be retracted or opened with respect to the wing. In the first mode, the deflector is retracted with respect to the wing, and during cruise, the deflector and the trailing edge flap are disposed at the positions where they do not reduce the speed during flight.

In the second mode, in a state where the leading edge of the deflector is separated from the wing with the trailing edge being close to the wing and the tip of the trailing edge flap is moved frontward, the first flow path is formed in which fluid flows from the rear to the front from the side in the state where the tip of the trailing edge flap is moved frontward to the leading edge side of the deflector. As a result, since the flow direction of the fluid becomes a reverse direction from the rear to the front, the function as a reverse injection device is exhibited.

According to this configuration, in the third mode, in a state where the leading edge of the deflector is separated from the wing with the trailing edge being close to the wing, the second flow path in which fluid flows from the front to the rear is formed on the lower surface side of the deflector. As a result, the fluid flowing on the upper surface of the wing is sucked by the cross flow fan, so that the peeling region on the upper surface of the wing can be reduced and the circulation around the wing can be strengthened. Therefore, it is possible to improve lift.

The aircraft according to the present disclosure is provided with the wing (10) described above.

REFERENCE SIGNS LIST

1: braking force generation device
2: cross flow fan
3: deflector
3a: leading edge
3b: trailing edge
4: blocker door
4a: tip
5: electric motor
6: drive unit
7: ball screw
8: worm gear mechanism
9: cylindrical worm
10: wing
11: flow path, second flow path
11a, 11b: opening
12: flow path, first flow path
12a, 12b: opening
13: worm wheel
14: rotary shaft
15: cam, first cam
16: cam, second cam
17: cam, third cam
18: first link
19: second link
20: third link
21, 22, 23: guide groove
24, 25, 26: link
27, 28, 29: cam
30: connecting rod
31, 32, 33: link
34, 35, 36: rotating plate
37, 38, 39: link
40: flow rate increasing device
41: high lift device
42: trailing edge flap
42a: tip
43: trailing edge flap
43a: tip
44: flow path, second flow path
44a, 44b: opening
45: flow path, first flow path
45a, 45b: opening
46: connecting rod

The invention claimed is:

1. A braking force generation device comprising:
a cross flow fan on a trailing edge side of a wing;
a deflector above the cross flow fan, the deflector being capable of being retracted with respect to the wing, and having a leading edge and a trailing edge such that both of the leading edge and the trailing edge are capable of being separated from the wing; and a blocker door below the cross flow fan, the blocker door being configured to rotate with one end side fixed to the wing as a center, and capable of being retracted or deployed with respect to the wing, wherein the braking force generation device is configured to have:

a first mode in which the deflector and the blocker door are retracted with respect to the wing;

a second mode in which, in a state where: (i) the leading edge of the deflector is separated from the wing; (ii) the trailing edge of the deflector is at or adjacent to the wing; and (iii) the blocker door is deployed; a first flow path is formed on a lower surface side of the deflector for fluid to flow from a rear of the wing to a front of the wing via the cross flow fan from an opening on a blocker door side to a leading edge opening on a leading edge side of the deflector in the first flow path; and a third mode in which, in a state where: (i) the leading edge of the deflector is separated from the wing; (ii) the trailing edge of the deflector is separated from the wing; and (iii) the blocker door is retracted: a second flow path is formed on the lower surface side of the deflector for the fluid to flow from the front of the wing to the rear of the wing via the cross flow fan from the leading edge opening on the leading edge side of the deflector to a trailing edge opening on a trailing edge side of the deflector in the second flow path, and wherein:

the second flow path provides communication between the leading edge opening and the trailing edge opening;

the leading edge opening is defined between the deflector and the wing and forward of the cross flow fan; and the trailing edge opening is defined between the deflector and the wing and rearward of the cross flow fan.

2. The braking force generation device according to claim 1, further comprising:

a drive unit;

a first cam configured to be rotated by a driving force generated by the drive unit;

a second cam configured to be rotated by the driving force generated by the drive unit;

a first link; and a second link, wherein:

one end side of the first link is connected to the first cam and another end side of the first link is connected to the leading edge of the deflector; and one end side of the second link is connected to the second cam and another end side of the second link is connected to the trailing edge of the deflector.

3. The braking force generation device according to claim 2, further comprising:

a third cam configured to be rotated by the driving force generated by the drive unit; and a third link, wherein one end side of the third link is connected to the third cam and another end side of the third cam is connected to the blocker door.

4. A wing comprising the braking force generation device according to claim 1.

5. The wing according to claim 4, further comprising:

a flow rate increasing device in front of the blocker door for supplying fluid from a front to a rear.

6. The wing according to claim 4, further comprising:

a flow rate increasing device behind the blocker door for supplying fluid from a front to a rear.

7. The wing according to claim 4, further comprising:

a high lift device behind the blocker door.

8. A wing comprising:

a cross flow fan on a trailing edge side of the wing;

a deflector above the cross flow fan, the deflector being capable of being retracted with respect to the wing, and having a leading edge and a trailing edge such that both of the leading edge and the trailing edge are capable of being separated from the wing; and a trailing edge flap below the cross flow fan, the trailing edge flap being configured to rotate with one end side fixed to the wing as a center, and capable of being retracted or deployed with respect to the wing, wherein the wing is configured to have:

a first mode in which the deflector is retracted with respect to the wing;

a second mode in which, in a state where: (i) the leading edge of the deflector is separated from the wing; (ii) the trailing edge of the deflector is at or adjacent to the wing; and (iii) a tip of the trailing edge flap is moved frontward; a first flow path is formed on a lower surface side of the deflector for fluid to flow from a rear of the wing to a front of the wing via the cross flow fan from a trailing edge opening on a trailing edge flap side to a leading edge opening on a leading edge side of the deflector in the first flow path; and a third mode in which, in a state where: (i) the leading edge of the deflector is separated from the wing; and (ii) the trailing edge of the deflector is at or adjacent to the wing: a second flow path is formed on the lower surface side of the deflector for fluid to flow from the front of the wing to the rear of the wing via the cross flow fan from the leading edge opening on the leading edge side of the deflector to the trailing edge opening on the trailing edge flap side in the second flow path, and wherein the second flow path provides communication between the leading edge opening which is defined forward of the cross flow fan and the trailing edge opening which is defined rearward of the cross flow fan.

9. An aircraft comprising the wing according to claim 4.

10. An aircraft comprising the wing according to claim 8.

* * * * *